(12) United States Patent
Dhanani et al.

(10) Patent No.: US 9,097,544 B2
(45) Date of Patent: Aug. 4, 2015

(54) LOCATION TRACKING FOR MOBILE COMPUTING DEVICE

(71) Applicant: QUALCOMM Incorporated, San Diego, CA (US)

(72) Inventors: Adil Dhanani, Mountain View, CA (US); Neeta Srivastava, San Jose, CA (US); Nitin Kumar, San Ramon, CA (US); Janell Paulson, Carlsbad, CA (US); Thomas Fong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/770,265

(22) Filed: Feb. 19, 2013

(65) Prior Publication Data
US 2013/0166200 A1    Jun. 27, 2013

Related U.S. Application Data

(63) Continuation of application No. 12/893,907, filed on Sep. 29, 2010, now Pat. No. 8,395,547, which is a continuation-in-part of application No. 12/549,249, filed on Aug. 27, 2009, now Pat. No. 8,228,234, and a continuation-in-part of application No. 12/872,703, filed on Aug. 31, 2010, now Pat. No. 8,755,815.

(51) Int. Cl.
*G01C 21/34*    (2006.01)
*G01C 21/26*    (2006.01)
(Continued)

(52) U.S. Cl.
CPC ............... *G01C 21/34* (2013.01); *G01C 21/26* (2013.01); *G01S 5/02* (2013.01); *G01S 5/0205* (2013.01); *G01S 19/34* (2013.01); *G01S 19/48* (2013.01); *H04L 67/18* (2013.01); *H04W 4/023* (2013.01);
(Continued)

(58) Field of Classification Search
USPC .......... 342/357.25, 357.46, 357.74, 419, 442, 342/451, 458, 465, 357.2; 701/465, 468
See application file for complete search history.

(56) References Cited

U.S. PATENT DOCUMENTS

| 4,907,290 A | 3/1990 | Crompton |
| 5,010,547 A | 4/1991 | Johnson et al. |

(Continued)

FOREIGN PATENT DOCUMENTS

| CN | 1592197 A | 3/2005 |
| CN | 1846330 A | 10/2006 |

(Continued)

OTHER PUBLICATIONS

U.S. Appl. No. 11/430,786, filed May 8, 2006, Baraban, et al.
(Continued)

*Primary Examiner* — Dao Phan
(74) *Attorney, Agent, or Firm* — Mahamedi Paradice LLP (57) ABSTRACT

A mobile computing device is disclosed. The mobile computing device includes a location determination circuit and a processing circuit. The processing circuit determines a current location of the mobile computing device and a destination location. The processing circuit determines an expected travel time from the current location to the destination location, and disables continuous location tracking for a duration of time. The duration is determined based on the expected travel time. Once the duration of time has elapsed, the processing circuit enables continuous location tracking.

13 Claims, 5 Drawing Sheets

(51) Int. Cl.

| | | |
|---|---|---|
| *G01S 5/02* | (2010.01) | |
| *G01S 19/34* | (2010.01) | |
| *G01S 19/48* | (2010.01) | |
| *H04W 4/02* | (2009.01) | |
| *H04L 29/08* | (2006.01) | |
| *H04M 1/725* | (2006.01) | |
| *H04W 48/16* | (2009.01) | |

(52) U.S. Cl.
CPC .......... *H04W 4/028* (2013.01); *H04M 1/72572* (2013.01); *H04M 2250/10* (2013.01); *H04W 4/027* (2013.01); *H04W 48/16* (2013.01)

(56) References Cited

U.S. PATENT DOCUMENTS

| | | |
|---|---|---|
| 5,012,219 A | 4/1991 | Henry |
| 5,075,684 A | 12/1991 | DeLuca |
| 5,359,317 A | 10/1994 | Gomez et al. |
| 5,375,226 A | 12/1994 | Sano et al. |
| 5,394,140 A | 2/1995 | Wong et al. |
| 5,430,436 A | 7/1995 | Fennell |
| 5,455,466 A | 10/1995 | Parks et al. |
| 5,508,736 A | 4/1996 | Cooper |
| 5,594,796 A | 1/1997 | Grube et al. |
| 5,596,567 A | 1/1997 | de Muro et al. |
| 5,600,225 A | 2/1997 | Goto |
| 5,612,682 A | 3/1997 | DeLuca et al. |
| 5,650,776 A | 7/1997 | Mitchell et al. |
| 5,666,530 A | 9/1997 | Clark et al. |
| 5,699,244 A | 12/1997 | Clark, Jr. et al. |
| 5,705,995 A | 1/1998 | Laflin et al. |
| 5,727,202 A | 3/1998 | Kucala |
| 5,729,735 A | 3/1998 | Meyering |
| 5,733,313 A | 3/1998 | Barreras et al. |
| 5,742,521 A | 4/1998 | Ellenby et al. |
| 5,758,150 A | 5/1998 | Bell et al. |
| 5,760,580 A | 6/1998 | Tyren |
| 5,787,233 A | 7/1998 | Akimoto |
| 5,815,411 A | 9/1998 | Ellenby et al. |
| 5,831,348 A | 11/1998 | Nishizawa |
| 5,838,262 A | 11/1998 | Kershner et al. |
| 5,850,187 A | 12/1998 | Carrender et al. |
| 5,852,187 A | 12/1998 | Thorner et al. |
| 5,870,765 A | 2/1999 | Bauer et al. |
| 5,875,434 A | 2/1999 | Matsuoka et al. |
| 5,884,168 A | 3/1999 | Kolev et al. |
| 5,901,358 A | 5/1999 | Petty et al. |
| 5,903,852 A | 5/1999 | Schaupp, Jr. et al. |
| 5,929,848 A | 7/1999 | Albukerk et al. |
| 5,938,721 A | 8/1999 | Dussell et al. |
| 5,958,006 A | 9/1999 | Eggleston et al. |
| 5,958,051 A | 9/1999 | Renaud et al. |
| 5,974,238 A | 10/1999 | Chase, Jr. |
| 5,974,330 A | 10/1999 | Negishi |
| 6,006,274 A | 12/1999 | Hawkins et al. |
| 6,016,476 A | 1/2000 | Maes et al. |
| 6,037,936 A | 3/2000 | Ellenby et al. |
| 6,047,579 A | 4/2000 | Schmitz |
| 6,061,561 A | 5/2000 | Alanara et al. |
| 6,104,291 A | 8/2000 | Beauvillier et al. |
| 6,111,538 A | 8/2000 | Schuchman et al. |
| 6,138,245 A | 10/2000 | Son et al. |
| 6,141,014 A | 10/2000 | Endo et al. |
| 6,148,294 A | 11/2000 | Beyda et al. |
| 6,157,630 A | 12/2000 | Adler et al. |
| 6,177,905 B1 | 1/2001 | Welch |
| 6,182,010 B1 | 1/2001 | Berstis |
| 6,182,221 B1 | 1/2001 | Hsu et al. |
| 6,184,651 B1 | 2/2001 | Fernandez et al. |
| 6,212,529 B1 | 4/2001 | Boothby et al. |
| 6,222,583 B1 | 4/2001 | Matsumura et al. |
| 6,243,689 B1 | 6/2001 | Norton |
| 6,246,376 B1 | 6/2001 | Bork et al. |
| 6,259,405 B1 | 7/2001 | Stewart et al. |
| 6,266,539 B1 | 7/2001 | Pardo |
| 6,297,737 B1 | 10/2001 | Irvin |
| 6,307,556 B1 | 10/2001 | Ellenby et al. |
| 6,307,919 B1 | 10/2001 | Yoked |
| 6,313,745 B1 | 11/2001 | Suzuki |
| 6,330,436 B1 | 12/2001 | Zidel |
| 6,346,881 B1 | 2/2002 | Davidson |
| 6,360,101 B1 | 3/2002 | Irvin |
| 6,389,290 B1 | 5/2002 | Kikinis et al. |
| 6,389,423 B1 | 5/2002 | Sakakura |
| 6,400,274 B1 | 6/2002 | Duan et al. |
| 6,401,104 B1 | 6/2002 | LaRue et al. |
| 6,401,118 B1 | 6/2002 | Thomas |
| 6,404,761 B1 | 6/2002 | Snelling et al. |
| 6,405,049 B2 | 6/2002 | Herrod et al. |
| 6,414,696 B1 | 7/2002 | Ellenby et al. |
| 6,424,845 B1 | 7/2002 | Emmoft et al. |
| 6,427,077 B1 | 7/2002 | Alberth et al. |
| 6,436,299 B1 | 8/2002 | Baarman et al. |
| 6,445,936 B1 | 9/2002 | Cannon et al. |
| 6,446,076 B1 | 9/2002 | Burkey et al. |
| 6,456,234 B1 | 9/2002 | Johnson |
| 6,487,180 B1 | 11/2002 | Borgstahl et al. |
| 6,490,521 B2 | 12/2002 | Wiener |
| 6,501,364 B1 | 12/2002 | Hui et al. |
| 6,510,424 B1 | 1/2003 | Ford et al. |
| 6,532,152 B1 | 3/2003 | White et al. |
| 6,532,480 B1 | 3/2003 | Boothby et al. |
| 6,542,750 B2 | 4/2003 | Hendrey et al. |
| 6,559,794 B1 | 5/2003 | Nakajima et al. |
| 6,577,249 B1 | 6/2003 | Akatsuka et al. |
| 6,601,093 B1 | 7/2003 | Peters |
| 6,671,700 B1 | 12/2003 | Creemer et al. |
| 6,673,250 B2 | 1/2004 | Kuennen et al. |
| 6,681,108 B1 | 1/2004 | Terry et al. |
| 6,687,608 B2 | 2/2004 | Sugimoto et al. |
| 6,731,071 B2 | 5/2004 | Baarman |
| 6,731,613 B1 | 5/2004 | Provance |
| 6,734,796 B2 * | 5/2004 | Forster et al. .............. 340/572.3 |
| 6,757,718 B1 | 6/2004 | Halverson et al. |
| 6,772,331 B1 | 8/2004 | Hind et al. |
| 6,795,110 B1 | 9/2004 | Kossin |
| 6,799,190 B1 | 9/2004 | Boothby |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,831,563 B1 | 12/2004 | Contractor |
| 6,832,178 B1 | 12/2004 | Fernandez et al. |
| 6,847,823 B2 | 1/2005 | Lehikoinen et al. |
| 6,850,986 B1 | 2/2005 | Peacock |
| 6,885,362 B2 | 4/2005 | Suomela |
| 6,888,438 B2 | 5/2005 | Hui et al. |
| 6,907,134 B1 | 6/2005 | Yamada et al. |
| 6,917,163 B2 | 7/2005 | Baarman |
| 6,920,328 B2 | 7/2005 | Wollrab |
| 6,928,452 B2 | 8/2005 | De La Huerga |
| 6,934,664 B1 | 8/2005 | Webb et al. |
| 6,941,270 B1 | 9/2005 | Hannula |
| 6,963,800 B1 | 11/2005 | Milbert |
| 6,975,198 B2 | 12/2005 | Baarman et al. |
| 6,982,962 B1 | 1/2006 | Lunsford et al. |
| 6,986,051 B2 | 1/2006 | Le Pennec et al. |
| 7,006,817 B2 | 2/2006 | Awada et al. |
| 7,027,823 B2 | 4/2006 | Mikuni |
| 7,065,658 B1 | 6/2006 | Baraban et al. |
| 7,084,758 B1 | 8/2006 | Cole |
| 7,088,389 B2 | 8/2006 | Shibasaki et al. |
| 7,103,370 B1 | 9/2006 | Creemer |
| 7,116,200 B2 | 10/2006 | Baarman et al. |
| 7,118,240 B2 | 10/2006 | Baarman et al. |
| 7,119,716 B2 | 10/2006 | Horstemeyer |
| 7,126,450 B2 | 10/2006 | Baarman et al. |
| 7,132,918 B2 | 11/2006 | Baarman et al. |
| 7,136,093 B1 | 11/2006 | Itoh et al. |
| 7,149,473 B1 | 12/2006 | Lindlar et al. |
| 7,164,255 B2 | 1/2007 | Hui |

(56) References Cited

U.S. PATENT DOCUMENTS

| | | |
|---|---|---|
| 7,164,885 B2 | 1/2007 | Jonsson et al. |
| 7,212,827 B1 | 5/2007 | Veschl |
| 7,248,017 B2 | 7/2007 | Cheng et al. |
| 7,256,731 B2 | 8/2007 | Siegel et al. |
| 7,260,399 B1 | 8/2007 | Oh et al. |
| 7,262,700 B2 | 8/2007 | Hsu |
| 7,266,379 B2 | 9/2007 | Blight et al. |
| 7,271,569 B2 | 9/2007 | Oglesbee |
| 7,274,299 B2 | 9/2007 | Osman |
| 7,286,880 B2 | 10/2007 | Olson et al. |
| 7,323,964 B1 | 1/2008 | Shyu et al. |
| 7,331,793 B2 | 2/2008 | Hernandez et al. |
| 7,336,964 B2 | 2/2008 | Casey |
| 7,360,248 B1 | 4/2008 | Kanevsky et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,385,643 B2 | 6/2008 | Muramatsu |
| 7,392,059 B2 | 6/2008 | White et al. |
| 7,414,380 B2 | 8/2008 | Tang et al. |
| 7,424,447 B2 | 9/2008 | Fuzell-Casey et al. |
| 7,446,672 B2 | 11/2008 | Johnson et al. |
| 7,453,491 B2 | 11/2008 | Kinjo |
| 7,454,170 B2 | 11/2008 | Goossens et al. |
| 7,460,064 B1 | 12/2008 | Tester et al. |
| 7,460,953 B2 | 12/2008 | Herbst et al. |
| 7,462,951 B1 | 12/2008 | Baarman |
| 7,471,986 B2 | 12/2008 | Hatlestad |
| 7,490,294 B2 | 2/2009 | Okada |
| 7,495,414 B2 | 2/2009 | Hui |
| 7,509,432 B1 | 3/2009 | Peacock |
| 7,521,890 B2 | 4/2009 | Lee et al. |
| 7,545,415 B2 | 6/2009 | Azuma et al. |
| 7,576,514 B2 | 8/2009 | Hui |
| 7,583,972 B2 | 9/2009 | Clipsham |
| 7,593,925 B2 | 9/2009 | Cadiz et al. |
| 7,613,427 B2 | 11/2009 | Blight et al. |
| 7,613,428 B2 | 11/2009 | Blight et al. |
| 7,720,436 B2 | 5/2010 | Hamynen et al. |
| 7,743,151 B2 | 6/2010 | Vallapureddy et al. |
| 7,805,719 B2 | 9/2010 | O'Neill |
| D640,976 S | 7/2011 | Matsuoka |
| 8,228,234 B2 | 7/2012 | Paulson et al. |
| 8,395,547 B2 | 3/2013 | Dhanani et al. |
| 8,755,815 B2 | 6/2014 | Kumar |
| 2001/0015759 A1 | 8/2001 | Squibbs |
| 2001/0040629 A1 | 11/2001 | Miyagi et al. |
| 2001/0055373 A1 | 12/2001 | Yamashita |
| 2002/0001032 A1 | 1/2002 | Ohki |
| 2002/0010617 A1 | 1/2002 | Hamaguchi et al. |
| 2002/0011951 A1 | 1/2002 | Pepin et al. |
| 2002/0019584 A1 | 2/2002 | Schulze et al. |
| 2002/0036991 A1 | 3/2002 | Inoue |
| 2002/0061031 A1 | 5/2002 | Sugar et al. |
| 2002/0075323 A1 | 6/2002 | O'Dell |
| 2002/0078075 A1 | 6/2002 | Colson et al. |
| 2002/0084698 A1 | 7/2002 | Kelly et al. |
| 2002/0086680 A1 | 7/2002 | Hunzinger |
| 2002/0091793 A1 | 7/2002 | Sagie |
| 2002/0103008 A1 | 8/2002 | Rahn et al. |
| 2002/0136184 A1 | 9/2002 | Liang et al. |
| 2002/0147717 A1 | 10/2002 | Barros et al. |
| 2002/0151334 A1 | 10/2002 | Sharma |
| 2002/0154178 A1 | 10/2002 | Barnett et al. |
| 2002/0184331 A1 | 12/2002 | Blight et al. |
| 2002/0184418 A1 | 12/2002 | Blight |
| 2002/0191862 A1 | 12/2002 | Neumann et al. |
| 2002/0194498 A1 | 12/2002 | Blight et al. |
| 2003/0022682 A1 | 1/2003 | Weston |
| 2003/0027553 A1 | 2/2003 | Davidson et al. |
| 2003/0052907 A1 | 3/2003 | Rekimoto |
| 2003/0054846 A1 | 3/2003 | Parry |
| 2003/0065742 A1 | 4/2003 | Culp et al. |
| 2003/0087602 A1 | 5/2003 | Kammer |
| 2003/0115224 A1 | 6/2003 | Obara et al. |
| 2003/0126180 A1 | 7/2003 | Bogart et al. |
| 2003/0164822 A1 | 9/2003 | Okada |
| 2003/0214255 A1 | 11/2003 | Baarman et al. |
| 2003/0233455 A1 | 12/2003 | Leber et al. |
| 2004/0024795 A1 | 2/2004 | Hind et al. |
| 2004/0049728 A1 | 3/2004 | Langford |
| 2004/0082341 A1 | 4/2004 | Stanforth |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0176107 A1 | 9/2004 | Chadha |
| 2004/0193499 A1 | 9/2004 | Ortiz et al. |
| 2004/0207522 A1 | 10/2004 | McGee et al. |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2004/0267730 A1 | 12/2004 | Dumais et al. |
| 2004/0268265 A1 | 12/2004 | Berger |
| 2005/0007067 A1 | 1/2005 | Baarman et al. |
| 2005/0012611 A1 | 1/2005 | Osman |
| 2005/0027702 A1 | 2/2005 | Jensen et al. |
| 2005/0033780 A1 | 2/2005 | Simelius et al. |
| 2005/0041618 A1 | 2/2005 | Wei et al. |
| 2005/0091272 A1 | 4/2005 | Smith et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2005/0135292 A1 | 6/2005 | Graumann |
| 2005/0157173 A1 | 7/2005 | Kurebayashi et al. |
| 2005/0171933 A1 | 8/2005 | Stepanich et al. |
| 2005/0227711 A1 | 10/2005 | Orwant et al. |
| 2005/0246396 A1 | 11/2005 | Oreizy et al. |
| 2005/0273459 A1 | 12/2005 | Moore et al. |
| 2006/0004512 A1 | 1/2006 | Herbst et al. |
| 2006/0035632 A1 | 2/2006 | Sorvari et al. |
| 2006/0041420 A1 | 2/2006 | Martin et al. |
| 2006/0061488 A1 | 3/2006 | Dunton |
| 2006/0061958 A1 | 3/2006 | Solomon et al. |
| 2006/0095348 A1 | 5/2006 | Jones et al. |
| 2006/0123055 A1 | 6/2006 | Atkinson et al. |
| 2006/0129533 A1 | 6/2006 | Purvis |
| 2006/0132045 A1 | 6/2006 | Baarman |
| 2006/0136129 A1 | 6/2006 | Yokozawa |
| 2006/0155466 A1 | 7/2006 | Kanda et al. |
| 2006/0181510 A1 | 8/2006 | Faith |
| 2006/0187049 A1 | 8/2006 | Moser et al. |
| 2006/0200556 A1 | 9/2006 | Brave et al. |
| 2006/0211430 A1 | 9/2006 | Persico |
| 2006/0294025 A1 | 12/2006 | Mengerlink |
| 2007/0035917 A1 | 2/2007 | Hoteling et al. |
| 2007/0061197 A1 | 3/2007 | Ramer et al. |
| 2007/0064406 A1 | 3/2007 | Beart |
| 2007/0077889 A1 | 4/2007 | Blight et al. |
| 2007/0088497 A1 | 4/2007 | Jung |
| 2007/0091861 A1 | 4/2007 | Gupta et al. |
| 2007/0120752 A1 | 5/2007 | Takasu |
| 2007/0149208 A1 | 6/2007 | Syrbe et al. |
| 2007/0182367 A1 | 8/2007 | Partovi |
| 2007/0185980 A1 | 8/2007 | Abraham et al. |
| 2007/0188284 A1 | 8/2007 | Dobbs |
| 2007/0192277 A1 | 8/2007 | Jackson |
| 2007/0200732 A1 | 8/2007 | Bachmaier |
| 2007/0202886 A1 | 8/2007 | Dhebri et al. |
| 2007/0225004 A1 | 9/2007 | Tang et al. |
| 2007/0246546 A1 | 10/2007 | Yoshida |
| 2007/0268392 A1 | 11/2007 | Paalasmaa et al. |
| 2007/0271367 A1 | 11/2007 | Yardeni et al. |
| 2007/0290654 A1 | 12/2007 | Govari et al. |
| 2007/0298715 A1 | 12/2007 | Blight et al. |
| 2008/0020786 A1 | 1/2008 | Smith et al. |
| 2008/0021637 A1 | 1/2008 | Staton et al. |
| 2008/0036653 A1 | 2/2008 | Huston |
| 2008/0045173 A1 | 2/2008 | Park et al. |
| 2008/0045236 A1 | 2/2008 | Nahon et al. |

(56) References Cited

U.S. PATENT DOCUMENTS

| | | | |
|---|---|---|---|
| 2008/0102786 A1 | 5/2008 | Griffin | |
| 2008/0125102 A1 | 5/2008 | Abel et al. | |
| 2008/0133918 A1 | 6/2008 | You et al. | |
| 2008/0134030 A1 | 6/2008 | Kansai et al. | |
| 2008/0195312 A1 | 8/2008 | Aaron et al. | |
| 2008/0196086 A1 | 8/2008 | Shintani et al. | |
| 2008/0231537 A1 | 9/2008 | Rofougaran et al. | |
| 2008/0248815 A1 | 10/2008 | Busch | |
| 2008/0254811 A1 | 10/2008 | Stewart | |
| 2008/0278894 A1 | 11/2008 | Chen et al. | |
| 2008/0287160 A1 | 11/2008 | Sasai et al. | |
| 2009/0001932 A1 | 1/2009 | Kamijo et al. | |
| 2009/0001941 A1 | 1/2009 | Hsu et al. | |
| 2009/0002394 A1 | 1/2009 | Chen et al. | |
| 2009/0008148 A1 | 1/2009 | Mashino | |
| 2009/0043504 A1 | 2/2009 | Bandyopadhyay et al. | |
| 2009/0046654 A1 | 2/2009 | Hoshi et al. | |
| 2009/0061870 A1 | 3/2009 | Finkelstein et al. | |
| 2009/0069869 A1 | 3/2009 | Stouffer et al. | |
| 2009/0088077 A1 | 4/2009 | Brown et al. | |
| 2009/0098903 A1 | 4/2009 | Donaldson et al. | |
| 2009/0106567 A1 | 4/2009 | Baarman | |
| 2009/0143078 A1 | 6/2009 | Tu et al. | |
| 2009/0170433 A1 | 7/2009 | Rhodes et al. | |
| 2009/0212637 A1 | 8/2009 | Baarman et al. | |
| 2009/0212737 A1 | 8/2009 | Johnson et al. | |
| 2009/0298511 A1 | 12/2009 | Paulson | |
| 2010/0007449 A1 | 1/2010 | Tait et al. | |
| 2010/0021176 A1 | 1/2010 | Holcombe et al. | |
| 2010/0045269 A1 | 2/2010 | LaFranchise et al. | |
| 2010/0070219 A1 | 3/2010 | Azancot et al. | |
| 2010/0076524 A1 | 3/2010 | Forsberg et al. | |
| 2010/0081377 A1 | 4/2010 | Corbridge et al. | |
| 2010/0081473 A1 | 4/2010 | Chatterjee et al. | |
| 2010/0081483 A1 | 4/2010 | Chatterjee et al. | |
| 2010/0083012 A1 | 4/2010 | Corbridge et al. | |
| 2010/0121965 A1 | 5/2010 | Chatterjee et al. | |
| 2010/0131443 A1 | 5/2010 | Agarwal et al. | |
| 2010/0131691 A1 | 5/2010 | Chatterjee et al. | |
| 2010/0146308 A1 | 6/2010 | Gioscia et al. | |
| 2010/0150073 A1 | 6/2010 | Sasao | |
| 2010/0156193 A1 | 6/2010 | Rhodes et al. | |
| 2010/0161506 A1 | 6/2010 | Bosenick et al. | |
| 2010/0169153 A1 | 7/2010 | Hwacinski et al. | |
| 2010/0172090 A1 | 7/2010 | Chatterjee | |
| 2010/0177476 A1 | 7/2010 | Hoteling et al. | |
| 2010/0180001 A1 | 7/2010 | Hardt | |
| 2010/0194336 A1 | 8/2010 | Azancot et al. | |
| 2010/0285817 A1 | 11/2010 | Zhao et al. | |
| 2010/0304794 A1 | 12/2010 | Beninghaus et al. | |
| 2010/0321321 A1 | 12/2010 | Shenfield et al. | |
| 2011/0018356 A1 | 1/2011 | Chatterjee | |
| 2011/0022350 A1 | 1/2011 | Chatterjee | |
| 2011/0037321 A1 | 2/2011 | Chatterjee | |
| 2011/0050503 A1 | 3/2011 | Fong et al. | |
| 2011/0106954 A1 | 5/2011 | Chatterjee et al. | |
| 2011/0143772 A1 | 6/2011 | Sridhara et al. | |
| 2011/0270836 A1 | 11/2011 | Yang et al. | |
| 2012/0030525 A1 | 2/2012 | Horstemeyer | |
| 2012/0052874 A1 | 3/2012 | Kumar | |
| 2014/0243014 A1 | 8/2014 | Kumar | |

FOREIGN PATENT DOCUMENTS

| | | |
|---|---|---|
| CN | 101185006 A | 5/2008 |
| CN | 101317485 | 12/2008 |
| DE | 102005013541 A1 | 9/2006 |
| EP | 395469 A2 | 10/1990 |
| EP | 1487184 A1 | 12/2004 |
| EP | 1494488 | 1/2005 |
| EP | 2072951 A2 | 6/2009 |
| EP | 2196814 A1 | 6/2010 |
| FR | 2601161 A1 | 1/1988 |
| GB | 2399466 | 9/2004 |
| GB | 2389720 B | 9/2005 |
| GB | 2389767 B | 4/2006 |
| JP | 09-259241 A | 10/1997 |
| JP | 3161388 B2 | 5/1999 |
| JP | 11143600 | 5/1999 |
| JP | 11-354348 A | 12/1999 |
| JP | 2004153593 | 5/2004 |
| KR | 2001109963 | 12/2001 |
| KR | 10-2005-0016840 A | 2/2005 |
| KR | 10-2005-0032997 A | 4/2005 |
| KR | 82857634 A | 4/2005 |
| KR | 20050087189 | 8/2005 |
| KR | 20050095477 | 9/2005 |
| KR | 20060008100 | 1/2006 |
| KR | 100616131 | 8/2006 |
| KR | 10-2005-0095477 | 9/2006 |
| KR | 10-2006-0096509 | 9/2006 |
| KR | 10-2008-0003546 A | 1/2008 |
| KR | 20080036702 | 4/2008 |
| KR | 10-0836634 B1 | 6/2008 |
| KR | 10-2008-0078024 A | 8/2008 |
| WO | WO-95/003686 A1 | 2/1995 |
| WO | WO-2004/098079 A1 | 11/2004 |
| WO | WO-2005004528 A1 | 1/2005 |
| WO | WO-2005/024865 A2 | 3/2005 |
| WO | WO-2007/033358 A2 | 3/2007 |
| WO | WO-2007/034421 A2 | 3/2007 |
| WO | WO-2007/080473 A1 | 7/2007 |
| WO | WO-2007/118125 | 10/2007 |
| WO | WO-2008/027836 | 3/2008 |
| WO | WO-2008/033670 A2 | 3/2008 |
| WO | WO-2008/044875 A1 | 4/2008 |
| WO | WO-2008/076526 A1 | 6/2008 |
| WO | WO-2008/133806 A1 | 11/2008 |
| WO | WO-2009/057771 A1 | 5/2009 |
| WO | WO-2010/005324 A1 | 1/2010 |
| WO | WO-2010/018903 A1 | 2/2010 |
| WO | WO-2010/062198 A1 | 6/2010 |
| WO | WO-2010/068062 A2 | 6/2010 |
| WO | WO-2010/068062 A3 | 7/2010 |
| WO | WO-2010/091269 A1 | 8/2010 |

OTHER PUBLICATIONS

U.S. Appl. No. 12/975,335, filed Dec. 21, 2010, Oh, et al.
U.S. Appl. No. 12/987,940, filed Jan. 10, 2011, Chatterjee, et al.
U.S. Appl. No. 29/323,688, filed Aug. 28, 2008, Matsuoka, et al.
"New Riverside University Dictionary", published by The Riverside Publishing Company, Copyright 1984 by Houghton Mifflin Company, 3 pages.
Bolter, David J. and MacIntyre, Blair, "Is It Live or Is It AR?", IEEE Spectrum, Aug. 2007, pp. 30-35.
Digital Cellular Telecommunications System (Phase 2+); AT Command Set for GSM Mobile Equipment (ME) (GSM 07.07 version 7.4.0 Release 1998), ETSI TS 100 916 V7.4.0 (Nov. 1999) 126 pages.
Digital Cellular Telecommunications System (Phase 2+); General Description of a GSM Public Land Mobile Network (PLMN) (GSM 01.02 version 6.0.1 Release 1997), ETSI TS 101 622 V.
EP Office Action received in EP Application No. 06850401.8; Mailed Feb. 3, 2012, pp. 8.
EP Search Report received in EP Application No. 06850401.8, Mailed Apr. 18, 2011, pp. 8.
Fasbender, A. et al., "Any Network, Any Terminal, Anywhere", IEEE Personal Communications (Apr. 1999), pp. 22-30, IEEE Press.
Free Online Dictionary.com, Prioritize, 1991, p. 1-2. http//www.thefreedictionary.com/prioritize.
Hui, et al., "A New Generation of Universal Contactless Battery Charging Platform for Portable Consumer Electronic Equipment," IEEE Trans Power Electronics, 20(3):620-627 (2005).
International Search Report and Writen Opinion dated Aug. 31, 2010 in International Application No. PCT/US2010/020054.
International Search Report and Written established by International Searching Authority, PCT/US2006/062371, Feb. 20, 2008, 10 pgs.
International Search Report and Written Opinion dated Nov. 22, 2011 in International Application No. PCT/US2011/029844.
International Search Report and Written Opinion dated Dec. 28, 2011 in International Application No. PCT/US2011/038729.

(56) References Cited

OTHER PUBLICATIONS

International Search Report and Written Opinion dated Feb. 23, 2011 in International Application No. PCT/US2010/042779.
International Search Report and Written Opinion dated Feb. 27, 2012 in International Application No. PCT/US2011/053856.
International Search Report and Written Opinion dated Apr. 20, 2010 in International Application No. PCT/US2009/055928.
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Written Opinion for International Application No. PCT/US2008/071324, mail date Oct. 22, 2008, 7 pages.
International Search Report and Written Opinion from International Application No. PCT/US2009/045387 dated Feb. 17, 2010, 8 pages.
Jing, J., et al., "Client Server Computing in Mobile Environments", ACM Computing Surveys, (Jun. 1999), pp. 117-157, vol. 31, Issue 2, ACM Press.
Kean, Steven, "Powermat Portable Wireless Charging Mat", pp. 1-12 dwnloaded from http://www.bigbruin.com/contentlpowermat_1 on Sep. 29, 2010.
Liang, et al., "An Implantable Bi-Directional Wireless Transmission System for Transcutaneous Biological Signal Recording," Physiol. Meas. 26:83-97 (2005).
Mel B. W. et al., "Tablet: Personal Computer in the Year 2000", Communications of the Association for Computing machinery, New Your, NY vol. 31, No. 6, Jun. 1, 1988, 639-646 XP000.
Opticon Users manual DWT 7133, Nov. 2000.
Palm™ m505 Handheld, printed from internet address: http:/www.palm.com/products/palmm505/ on Sep. 20, 2001.
Skyhook Wireless, "How It Works", printed from internet address: http://developer.skyhookwireless.com/how-it-works/, on Apr. 12, 2007, 2 pages.
Stein, Augmented reality: iPhone 3G S killer app?, printed from Internet address: http://news.cnet.com/8301-17938_105-10266380-1.html on Dec. 9, 2009, 3 pages.
Troy Saulnier. Andre Trudel and Jason Zwicker, "A dynamic intelligent frequency based search engine," Nov. 1999.
US Office Action for U.S. Appl. No. 11/890,794, mail date Sep. 1, 2009, 15 pages.
CN application No. 201010521025.8, Search Report mailed on Jul. 4, 2013, 2 pages.
Anonymous:"Google Using Mobile Apps to Crowdsource a Massive Database of WiFi Hot Spots | Mobile Marketing Watch", Jun. 29, 2010, XP055151864, Retrieved from the Internet:URL:http://www.mobilemarketingwatch.com/google-using-mobile-apps-to-crowdsource-a-massive-database-of-wifi-hot-spots-7659/[retrieved on Nov. 10, 2014].
Digital Cellular Telecommunications System (Phase 2+); Specification of the SIM Application Toolkit for the Subscriber Identity Module—Mobile Equipment (SIM—ME) interface (GSM 11.14 Version 5.2.0, Dec. 1996), ETSI, 56 pages.
European Search Report—EP11833094—Search Authority—Munich—Nov. 19, 2014.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Sevanto, et al., "Introducing quality-of-service and traffic classes in wireless mobile networks," 1998, pp. 21-29, Proceedings of the 1st ACM international workshop on Wireless mobile multimedia.

* cited by examiner

LOCATION TRACKING FOR MOBILE COMPUTING DEVICE

CROSS-REFERENCE TO RELATED APPLICATIONS

This application is a continuation of U.S. application Ser. No. 12/893,907, filed Sep. 29, 2010, which is a continuation-in-part of U.S. application Ser. No. 12/549,249, filed Aug. 27, 2009, issued as U.S. Pat. No. 8,228,234, and a continuation-in-part of U.S. application Ser. No. 12/872,703, filed Aug. 31, 2010; the aforementioned applications being incorporated by reference in their entirety.

BACKGROUND

Some mobile computing devices provide location-based services to a user. For example, a mobile computing device may use a navigation application to provide directions from the user's current location to a desired destination. A location-determining circuit or system may be used to periodically determine the location of the mobile computing device.

Mobile computing devices may also have wireless transceivers configured to communicate with various types of wireless devices over various types of wireless networks.

DETAILED DESCRIPTION

Some embodiments described herein may use heuristic data to determine when to check if a mobile computing device is at a predetermined destination. Some embodiments described herein may determine a probability of when a mobile computing device will arrive at a location. Some embodiments described herein may capture the arrival or departure of a mobile computing device at a location without excessively draining the battery, such as during times when a user is not moving.

Referring to FIGS. 1-4, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 may be a smartphone, which is a combination mobile telephone and handheld computer having PDA functionality. PDA functionality can comprise one or more of personal information management (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download, SecureDigital card, etc.

As shown in FIGS. 1-4, device 10 includes a housing 12 and a front 14 and a back 16. Device 10 further comprises a display 18 and a user input device 20 (e.g., a QWERTY keyboard, buttons, touch screen, speech recognition engine, etc.). Display 18 may comprise a touch screen display in order to provide user input to a processing circuit 101 (see FIG. 4) to control functions, such as to select options displayed on display 18, enter text input to device 10, or enter other types of input. Display 18 also provides images (see, e.g., FIG. 5) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies, etc. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, etc. One or more indicator areas 38 (e.g., lights, etc.) may be provided to indicate that a gesture has been received from a user.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment.

Figure 1:
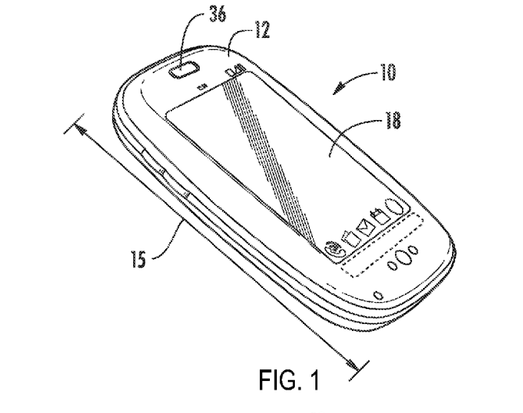
FIG. 1 is a perspective view of a mobile computing device according to an exemplary embodiment.
Figure 2:
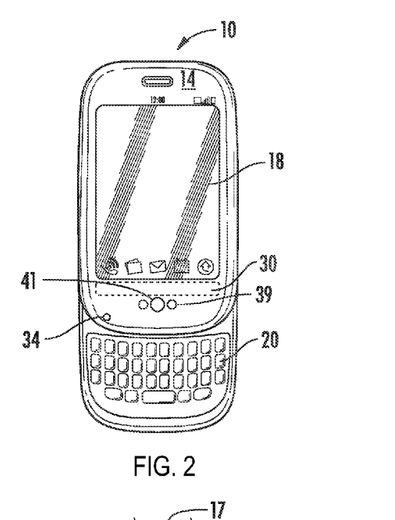
FIG. 2 is a front view of the mobile computing device of FIG. 1 in an extended configuration according to an exemplary embodiment.
Figure 3:
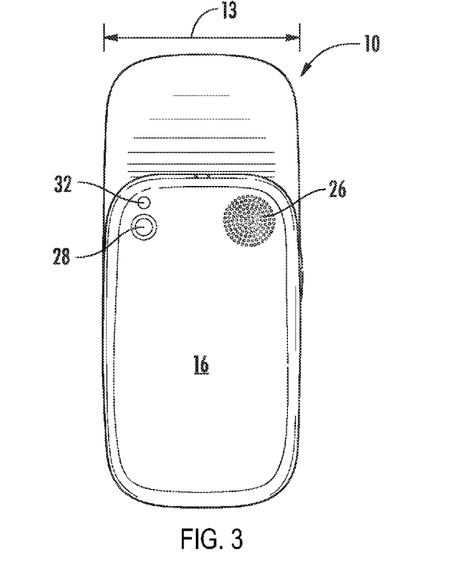
FIG. 3 is a back view of the mobile computing device of FIG. 1 in an extended configuration according to an exemplary embodiment.
Figure 4:
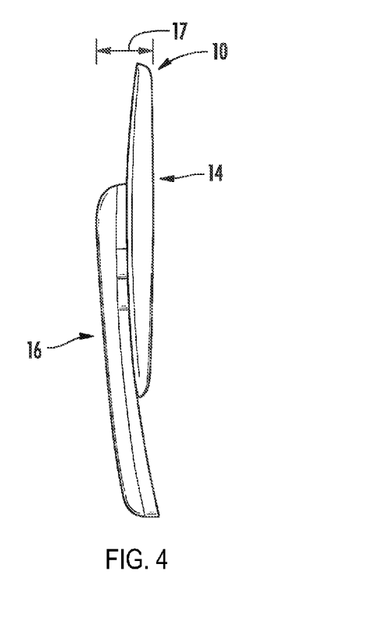
FIG. 4 is a side view of the mobile computing device of FIG. 1 in an extended configuration according to an exemplary embodiment.

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 2, the rear surface shown in FIG. 3, the side surfaces as shown in FIG. 4, etc.). Furthermore, various components, such as a keyboard, etc., may be retractable to slide in and out from a portion of device 10 to be revealed along any of the sides of device 10, etc. For example, as shown in FIGS. 2-4, front 14 may be slidably adjustable relative to back 16 to reveal input device 20, such that in a retracted configuration (see FIG. 1) input device 20 is not visible, and in an extended configuration (see FIGS. 2-4) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 5:
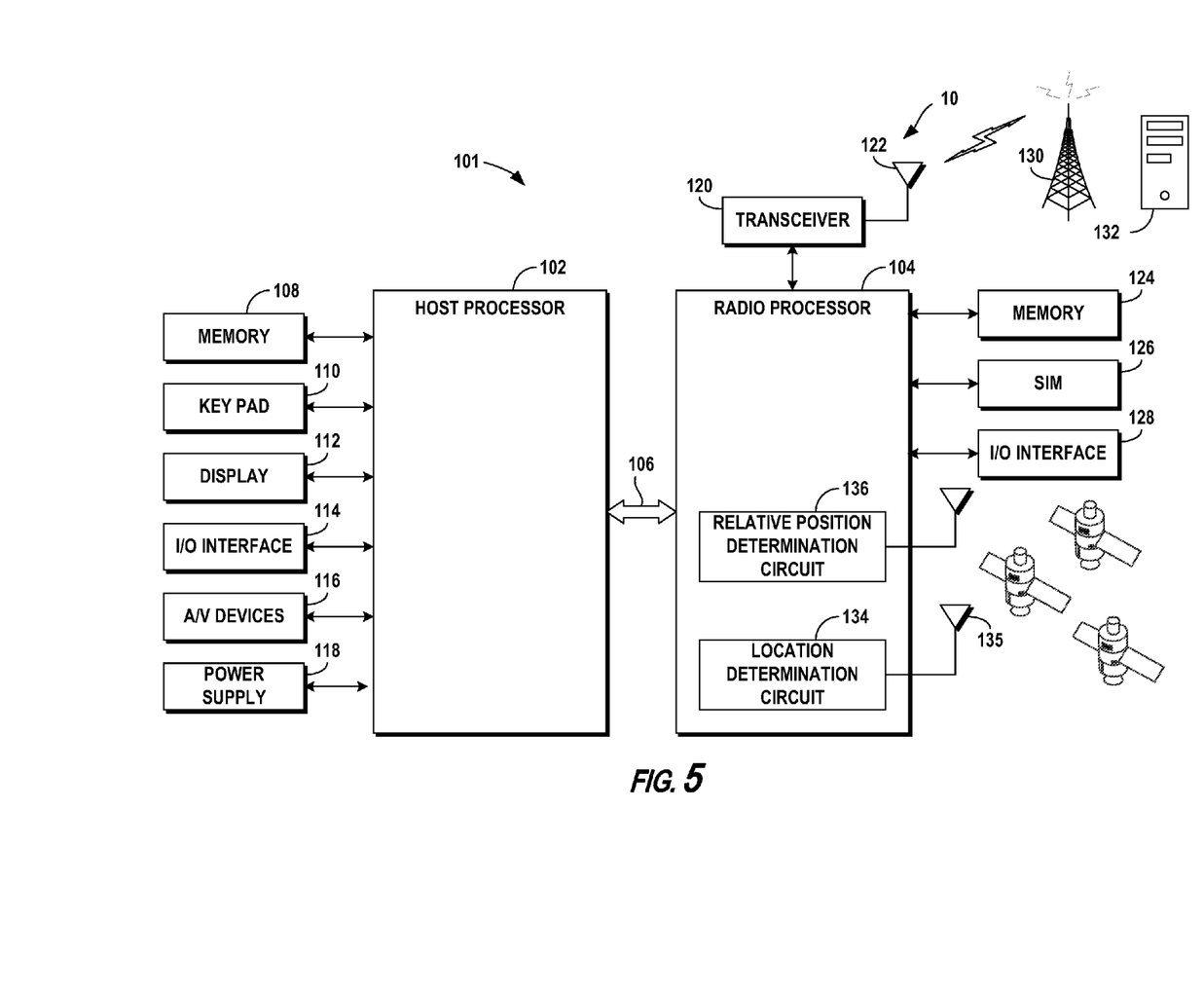
FIG. 5 is a block diagram of the mobile computing device of FIG. 1 according to an exemplary embodiment.

As shown in the embodiment of FIG. 5, device 10 may comprise a processing circuit having a dual- or mufti-processor architecture including a host processor 102 and a radio processor 104 (e.g., a base band processor). Host processor 102 and radio processor 104 may be distinct, separate or different chips, integrated circuit packages, parts or components. The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth. Alternatively, the processing circuit may comprise one processor, more than two processors, and/or other analog and/or digital circuit components configured to or programmed to operate as described herein with respect to the various embodiments.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 as distinct processing components fabricated on a single chip, etc.

In various embodiments, the host processor 102 may be implemented as a host central processing unit (CPU) using any suitable processor or an algorithm device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable an algorithm device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 10 may utilize any suitable as in accordance with the described embodiments such as a Palm WebOS, Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) as, and so forth.

Device 10 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or nonvolatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support A/V capability of device 10. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or an algorithm device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of wireless access points using different protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EVDO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or rewriteable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFLT) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 10 may be configured to operate in one or more location determination modes including, for example, a standalone mode, a mobile station (MS) assisted mode, and/or a MS-based mode. In a standalone mode, such as a standalone GPS mode, device 10 may be configured to determine its position without receiving wireless navigation data from the network, though it may receive certain types of position assist data, such as almanac, ephemeris, and coarse data. In a standalone mode, device 10 may comprise a local location determination circuit 134 (e.g., a GPS receiver) which may be integrated within housing 12 (FIG. 1) configured to receive satellite data via an antenna 135 and to calculate a position fix. Local location determination circuit may alternatively comprise a GPS receiver in a second housing separate from housing 12 but in the vicinity of device 10 and configured to communicate with device 10 wirelessly (e.g., via a PAN, such as Bluetooth). When operating in an MS-assisted mode or an MS-based mode, however, device 10 may be configured to communicate over a radio access network 130 (e.g., UMTS radio access network) with a remote computer 132 (e.g., a location determination entity (PDE), a location proxy server (LPS) and/or a mobile positioning center (MPC), etc.). Remote computer 132 may in alternative embodiments comprise any server computer used for any of a variety of functions (e.g., a shared, scaleable computing resource such as a cloud computing environment, or one or more other server computers).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 10 may be configured to determine its position using acquisition data or other wireless data from the remote computer 132. The acquisition data may be provided periodically. In various implementations, device 10 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

In various embodiments, device 10 may comprise dedicated hardware circuits or structures, or a combination of dedicated hardware programmed with code, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 10 or from a source external to device 10. For example, the user of device 10 may interact with a data input device to command the LBS application to send a location request. The LBS application also may send a location request in response to receiving input from an external network element or computing device that is attempting to locate the user of device 10. In some cases, the LBS application also may be configured to automatically, periodically, and/or autonomously send location requests.

Although other applications may operate without regard to the location of device 10, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide location determination capabilities for device 10. In some embodiments, the position engine may be implemented as software operating in conjunction with hardware (e.g., GPS receiver hardware) allowing device 10 to receive and process GPS satellites signals for location determination. In one embodiment, the position engine may be implemented as a QUALCOMM® gpsOne® engine.

In various implementations, the position engine may employ one or more location determination techniques such as GPS, CGI, CGI+TA, EFLT, TDOA, AOA, AFLT, OTDOA, EOTD, AGPS, GPS/AGPS, hybrid techniques, and so forth. The position engine also may be configured to operate in one or more location determination modes including a standalone mode, an MS-assisted mode, and an MS-based mode. The determined position information generated and/or obtained by the position engine generally may comprise any type of information associated with the location of device 10. Examples of position information may include, without limitation, current location, latitude, longitude, altitude, heading information, vector information such as horizontal and vertical velocity, sector-based position location, position fix information, position uncertainty, device orientation, and so forth.

In various embodiments, device 10 may be used in connection with a variety of applications that require determination of the location of device 10. Various navigation and mapping applications may be utilized to provide various types of data and information to users, including driving directions, map information, point of interest (POI) information, etc. One such application may be a family or friend/buddy connect application which may be configured to determine that a mobile device arrives at or departs from a predetermined location or destination (e.g., home, work, school, friend's house, shopping mall, etc.) and to generate a message and send the message to one or more other computing devices to notify the other devices that the first device has arrived or departed. The application may be configured to store message addresses (e.g., phone numbers for text, voice, or MMS messages, e-mail addresses, etc.) for one or more other people in a family or buddy list and to further store one or more locations that will trigger the generation and sending of a message to the one or more other people's computing devices or on-line accounts (e.g., social networking account such as a Facebook account, e-mail account, instant message account, etc.). Such an application operates using periodic location data from location determination circuit 134, in order to determine when the device has arrived at or near, or departed from a predetermined location.

A location determining circuit or system such as location determining circuit 134 (see FIG. 5) may periodically or continuously determine or track (e.g., obtain, request or determine a position fix, update a location, etc.) the location of device 10 at a standard rate or period (e.g., every second, twice per second, etc.) on a continuous, ongoing basis. Utilizing a location determining system in such a manner, however, typically requires significant power. Should a device rely on a power source such as a battery (e.g., as in the case with typical mobile phones, smart phones, and other mobile devices), the available usage time of the device may be significantly decreased because of the power requirements of the location determining system.

Figure 6:
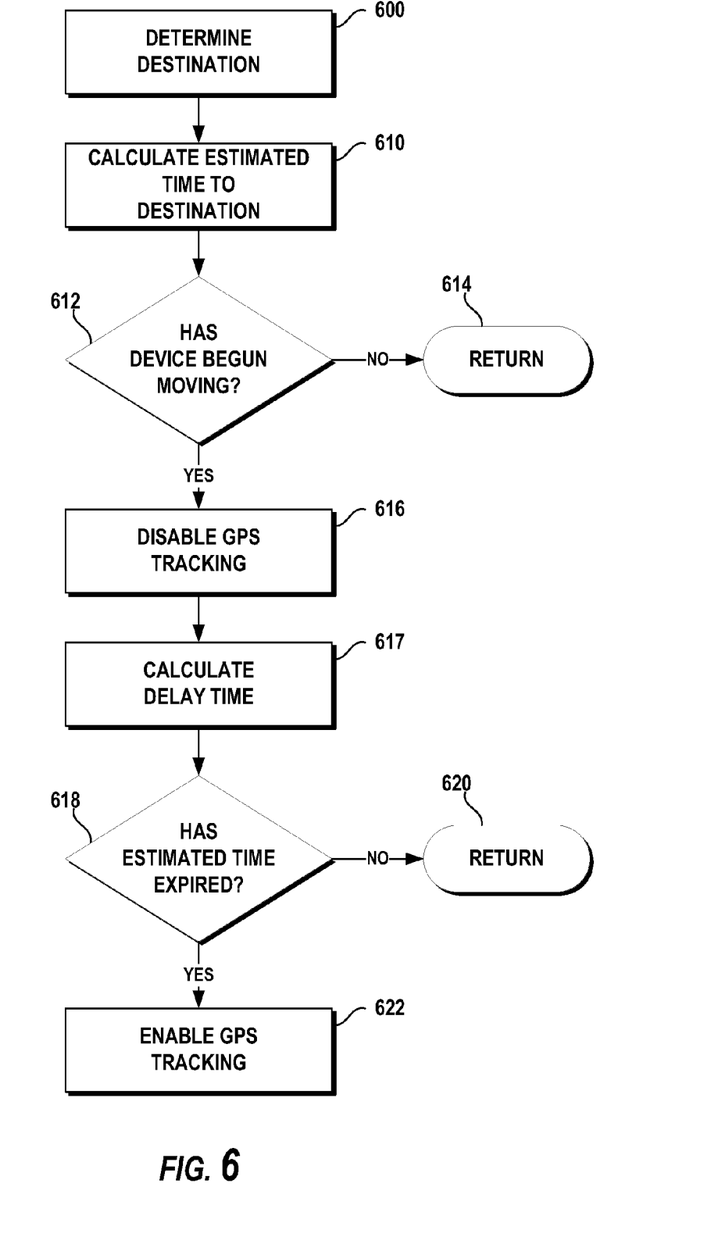
FIG. 6 is a flow diagram of a location tracking algorithm, according to an exemplary embodiment.

Referring now to FIG. 6, a flowchart of a method of disabling continuous location tracking during travel to a destination will be described. The operations described may be operable on mobile device 10, a remote server 132 (e.g., a shared, scaleable computing resource such as a cloud computing environment, or one or more other server computers), or partially operable on both device 10 and remote server 132. The operations described in FIG. 6 maybe performed in any order, at the same time as other operations are performed, etc. One or more of the operations may be implemented apart from others of the operations, in various embodiments.

At block 600, processing circuit 101 is configured to determine or identify a location, such as one or more destinations (including waypoints) or other locations of interest. Destinations may comprise location data, such as latitude/longitude and/or altitude data or data using other coordinate or reference systems, such as wireless access point identifiers, and may further comprise a textual or alphanumeric destination name. Processing circuit 101 may be configured to receive the location or locations from a user (e.g., via user input device), from one or more applications operating on circuit 101 (such as a friend finder application, family connect application configured to share location data among family members or other friend or buddy lists), from a remote server coupled to the Internet (e.g., from a social networking site, navigation or mapping system, etc.), or from other sources. In one embodiment, processing circuit 101 may be configured to operate a distinct software application or service configured to register or store locations as they are received, and to retain a plurality of such locations.

At a block 610, circuit 101 is configured to calculate an estimated time to the destination. The calculation may be made using a local or remote route calculation algorithm, such as one provided by GoogleMaps, by Google, Inc., Mountain View, Calif. The estimated time to destination may take into consideration a variety of factors, such as traffic, road construction projects, historical data from device 10 or other devices having previously travelled part or all of the route, etc. At a block 612, circuit 101 is configured to detect that device 10 has begun moving toward the destination, for example by enabling a location tracking circuit which continuously generates location data and determining when the tracked location has changed greater than a predetermined distance. If device 10 has not yet begun movement, the algorithm returns for processing other functions (block 614).

At a block 616, continuous location tracking is disabled. The disable step may occur at or a short time after circuit 101 determines device 10 has begun moving or begun moving toward the destination or along a route calculated in block 610. The disabling of continuous location tracking may be turning a GPS tracking function off, which may save power consumed by location determination circuit 134. The disabling of continuous location tracking may be simply leaving a GPS tracking function off if the GPS tracking function is already off.

At block 617, circuit 101 is configured to calculate a delay time, which will represent the time period that GPS tracking will be disabled before being enabled. In one embodiment, the delay time may be set to approximately equal the estimated time to destination. In alternative embodiments, the delay time may be less than or greater than the estimated time to destination. For example, the delay time may be set to a fraction of the estimated time to destination (e.g., ⅞ths, ¾s, ½, etc.) to allow for variations in actual travel time relative to the calculated estimated time to destination.

At block 618, circuit 101 is configured to determine whether the estimated time has expired. If not, the algorithm returns for processing other functions (block 620). If so, continuous location tracking is enabled or re-enabled (block 622). The process may be repeated if device 10 is not yet at or near the destination.

To determine whether device 10 is at or near the destination, a current location of device 10 is compared to the destination location. For example, a current cellular base station ID detected by radio processor 104 may be compared to a cellular base station ID associated with the destination. As another example, a latitude/longitude generated by location determination circuit 134 may be compared to a latitude/longitude of the destination location to determine if the two values are within a predetermined distance of each other (e.g., less than about 10 meters, less than about 100 meters, less than about 1 mile, etc.). If a match is identified, a notification message is generated (e.g., by creating a text message, instant message, Short Message Service (SMS) message, HyperText Markup Language (HTML) message, phone call, e-mail message, paging message, or other message or alert). Device 10 may then be configured to send the message over a wireless communication link.

According to one exemplary embodiment, circuit 101 may be configured to operate a family connect application, friend finder application, or other application configured to share location data among a plurality of mobile devices. In this embodiment, circuit 101 may be configured, in response to determining the device is at or near a destination, to generate a wireless message, address the wireless message to another computing device, and/or transmit the wireless message to the other computing device using the wireless transceiver 120. For example, a parent may wish to know when their child is approaching a school, friend's house, park, or other intended destination of the child. Device 10 may be carried by the child and be configured to store a location associated with the destination. When the device 10 comes within range of the destination, the message is sent from device 10 to a parent's device (e.g., home computer, laptop, mobile device, etc.).

The algorithm of FIG. 6 may be used for waypoints as one example of destinations, or for exits, turns, intersections, or other features of a route. For example, if device 10 is on a freeway and the exit per the calculated route is not coming up for 30 minutes, device 10 could turn off continuous location tracking for about 30 minutes and preserve some battery life.

According to another embodiment, processing circuit 101 may be configured to operate a distinct software application or service configured to register or store locations as they are received, and to retain a plurality of such locations in memory. Different applications (services, internal process on host processor or modem processor, etc.) can register locations they are interested in with the distinct software application. Circuit 101 may be configured to operate the distinct application to periodically monitor the user's current location and calculate the time needed to reach all of the locations registered by the applications. The service will then set a timer that will expire a predetermined time before the shortest duration calculated. When the predetermined time expires, the service will check the user's current location and if it is close to any of the locations registered, the service will turn on GPS tracking. When GPS tracking determines that the user has reached the location, tracking may be turned off, the service may send a message to the application that registered the location, and the application that registered the location may then take further action on the data, such as generating a message, alert, etc. for the user or for other users.

Figure 7:
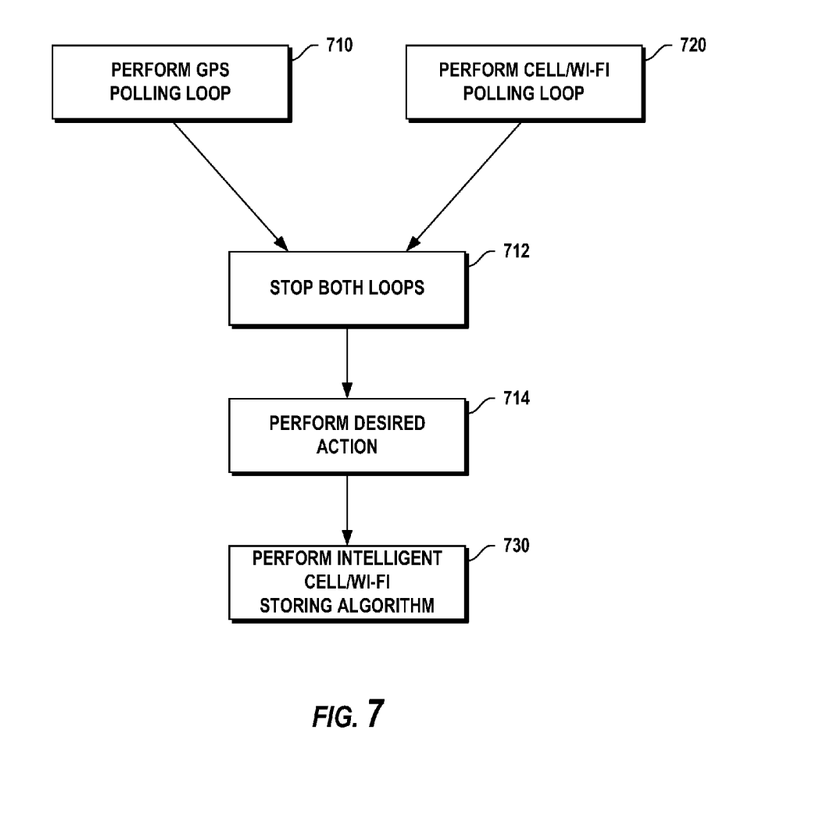
FIG. 7 is a flow diagram of a system and method of location tracking or polling, according to an exemplary embodiment.

Referring now to FIG. 7, a flow diagram of a system and method of location tracking or polling will be described. One exemplary location-based application is an application configured to send a notification or reminder when a mobile device is near a particular location of interest, such as a grocery store, electronic store, laundromat, etc. Another exemplary location-based application is an application configured to determine when a mobile device is at or near a destination or other location of interest and to send a message to another computing device notifying the other computing device that the first computing device has arrived at the destination. In these or other location-based applications, continuous location polling or tracking may be used, but this polling consumes energy. Dynamic polling may be based on the speed which device 10 is moving and a distance between the intended location and current location. For example, if a user is 50 miles away from an intended location, device 10 may poll every 20 minutes. If device 10 knows the velocity, then this duration may be calibrated even more. When a user is 10 miles away from a location, the periodic time may be decreased for polling to 5 minutes. After 5 minutes, the time may be reduced to 1 minute, etc.

FIG. 7 shows several block representing algorithms operable on a processing circuit. Block 710 comprises a GPS polling loop 710, a wireless access point polling loop 720, and a wireless access point storing algorithm 730. GPS polling loop 710 is configured to track or poll the location of device 10 as it moves using one or more GPS-based location determination technologies. Polling loop 710 may predict when device 10 will arrive at a predetermined location and disable or delay continuous location calculations until device 10 is expected to be near the predetermined location. Wireless access point polling loop 720 is configured to monitor or poll the identifiers of wireless access points, such as cellular base stations and wi-fi routers, to determine whether the mobile device has arrived at a predetermined location. Loops 710 and 720 may operate simultaneously, together, in parallel and/or at the same time, and may begin at the same time, for example, based on a request from another application operating on device 10, based on a request from the user, based on a determination that the device has begun moving, based on a determination that one or more predetermined locations have been stored and are to be monitored, and/or based on other events. At block 712, loops 710 and 720 may stop some or all of their processing operations based at least in part on one of loops 710 and 720 determining that device 10 has arrived at or near the predetermined location. At block 714, a desired action may be performed, such as generating a notification message and sending it to an application operating on device 10, to an application operating on a remote server, or through a wireless network to another computing device, such as a friend or family computing device.

Loop 730 is configured to store wireless access point information after arrival at the predetermined location. Storage of this information may improve future operations of loop 720.

Figure 8:
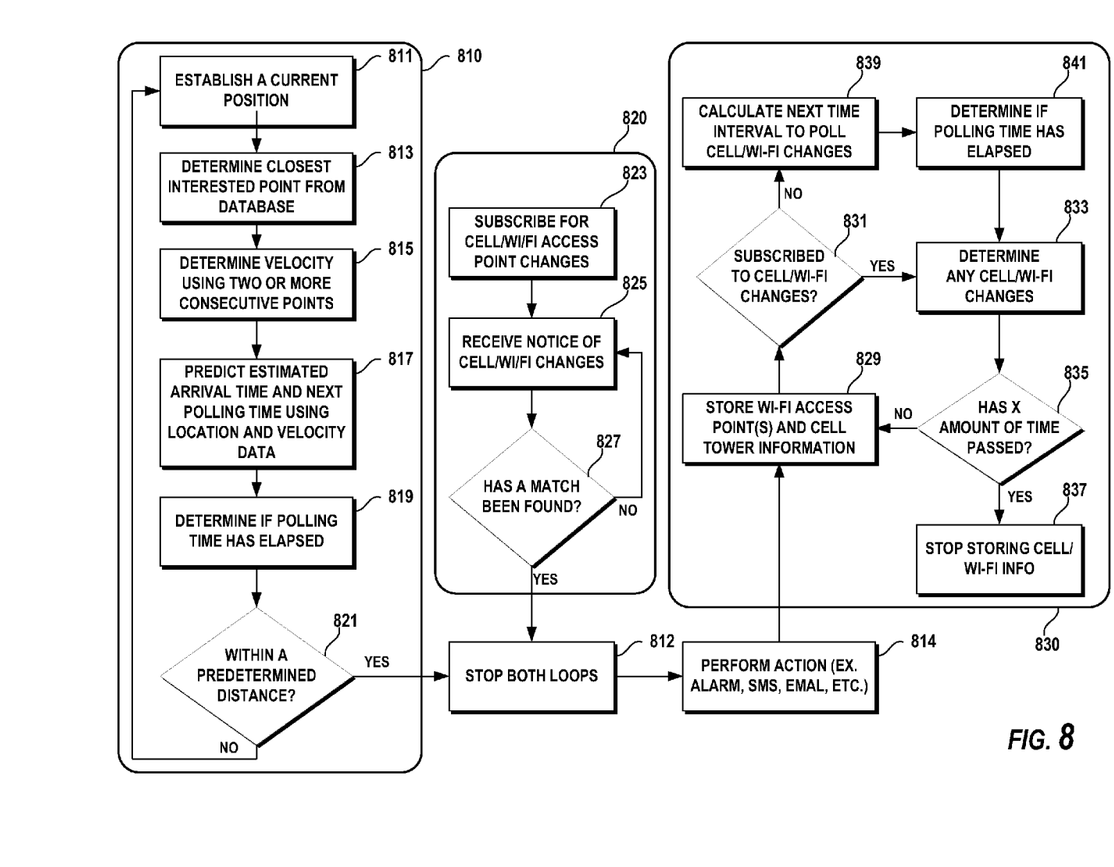
FIG. 8 is a more detailed flow diagram of the flow diagram of FIG. 7, according to an exemplary embodiment.

Referring now to FIG. 8, a more detailed flow diagram of the flow diagram of FIG. 7 will be described. At block 811, the processing circuit 101 of device 10 is configured to determine or establish a current position, which may be done using any of the positioning techniques described herein. At block 813, circuit 101 is configured to determine one or more closest locations or points of interest from a database stored on device 10 or remotely. The database may be populated with predetermined locations by receiving input data from a user input device, by receiving input data from an application operating on a server computer accessible via the Internet, from data received from other applications operating on device 10, etc. The predetermined locations may further comprise identifiers of one or more wireless access points at, near, in the vicinity of, or otherwise associated with the locations (e.g., a cellular base station ID, a wi-fi router ID, etc.). The closest interested point from the database may be calculated by generating a distance from the current position from block 811 to each of the interested points in the database, sorting by shortest distance, and selecting the shortest distance.

At block 815, a velocity of device 10 is determined, which may be calculated from two or more position fixes divided by the time between the position fixes, which may be consecutive points. At block 817, an estimated or predicted time of arrival or travel time to the selected point of interest may be calculated based on the determined velocity (which may be repeated several times over the course of a trip). Further, a delay time may be calculated based on the expected travel time. The delay time may be equal to the expected travel time, or may be less than the expected travel time (e.g., 90% of the travel time, 80% of the travel time, etc.), in order to allow for changes or variations in travel speed, expected stops, missed turns, etc.

Continuous location tracking may be disabled at any point before or after steps 811, 813, 815, 817 or 819, in order to conserve battery power. For example, continuous GPS tracking or polling typically occurs on the order of every second to every few seconds. This continuous tracking may be disabled, so that a next GPS position calculation is instead made at a calculated time much greater than every few second, such as multiple minutes or longer, and preferably the time for a next GPS position calculation may be calculated instead of being periodic. At block 819, if the determined polling time has elapsed, at a block 821, circuit 101 is configured to calculate a new position fix and determine whether device 10 is within a predetermined distance of the location of interest. If not, processing returns to block 811. If so, processing continues with block 812. The predetermined distance may be determined based on one or more criteria, such as a preset distance selected by a user, the system as designed by the manufacturer, or an enterprise IT manager, a size of the point of interest, population density around the point of interest or new location, wi-fi access point IDs in the area of the point of interest or new location, a distance that a cell tower covers, a type of interested point (e.g., school, office laundromat, coffee shop, airport, etc.), etc.

Referring to loop 820, at a block 823 the application may be programmed to subscribe for wireless access point ID changes. In this way, the application will be notified when there is a new cell or wi-fi ID being detected, such as by the radio processor 104. This can be achieved in a number of ways. For example, device 10 may operate a polling process which runs a collector algorithm which will check the cell and wi-fi signals received by radio processor 104 on a periodic basis, and will inform the listener (polling process) if the current collection is different from last collected cell/wi-fi IDs. As another example, device 10 may operate a subscription process, in which device 10 supports notification-based subscription for cell/wi-fi; whenever there is a cell or wi-fi change, device 10 will notify the listener for that change. The subscription may be for one process on device 10 to subscribe to another process on device 10.

At a block 825, circuit 101 is configured to receive an indication of a new, next, or updated wireless access point identifier received by the wireless transceiver. At block 827, circuit 101 is configured to determine whether the new wireless access point identifier matches one of the plurality of stored wireless access point identifiers associated with a predetermined location. If no match is found, processing returns to block 825. If a match is found, both loops may be stopped (block 812, optional) and an action may be performed (block 814), such as the generation of a notification message based on the new wireless access point identifier matching one of the stored wireless access point identifiers. The notification message may be in the form of an alert or alarm on device 10 (audible, visual, and/or tactile), an SMS being sent to a pre-stored destination address, and e-mail sent, etc. For example, a textual message (e.g., alpha, numeric, alphanumeric, etc.) may be presented to a user via display on device 10.

In loop 830, at a block 829, wi-fi access point(s) and/or cell tower IDs may be stored upon, after, or during arrival of device 10 at one of the predetermined locations. The IDs may confirm pre-existing IDs in the database or may be new IDs stored in association with the predetermined location to update the ID data associated with the location. At a block 831, the application is configured to determine whether it is subscribed for additional cell/wi-fi changes, for example as described above with reference to block 823. If so, processing continues at block 833 to determine whether there are any new cell/wi-fi changes (e.g., since last stored and received at block 829). If so, block 835 indicates that such new cell/wi-fi IDs are stored for only a predetermined period of time after arrival at the destination, after which new cell and/or wi-fi IDs are no longer stored (block 837). If the predetermined period of time has not passed, the application continues to update the plurality of wireless access points associated with the predetermined location (block 829).

As with the distance of block 821, the amount of time of block 835 may similarly be based on the size of the interested point, population density, etc. For example, assume the intended location is a school, so the area for the school is big. Chances are that many times we will see different cell/wi-fi IDs in that area, depending on which cell and wi-fi access points the device is using or seeing at that moment. So if we store the cell/wi-fi access points for, say 5 minutes after reaching the school, the chances are that next time even if the device is using or seeing a different cell or wi-fi access point, circuit 101 will still consider the location to be a match with the school.

As another example, assume the destination is a shopping mall. In this case, chances are there will be many entrances for the mall. A user can come to this destination from different directions. So if device 10 collects the cell and wi-fi IDs for say 15 min, 30 minutes or an hour, then chances are we will capture most of the cell and wi-fi IDs in that area. Therefore, even if a user takes a different entrance next time we will be able to find a match in loop 820. Loop 830 further provides a heuristic or learning aspect, in that the determination of a match (block 827) will improve with more trips to the destination. Even if loop 810 detects the location (block 821) instead of loop 820 (block 827), device 10 will still execute loop 830 so that next time loop 820 will report a location match as well, and perhaps sooner.

Returning to block 831, if device 10 is not subscribed to cell/wi-fi changes or not receiving them at the time, processing may continue at block 839 to calculate a next time interval to poll for cell/wi-fi changes. At block 841, if polling time has elapsed, processing continues at block 833. Blocks 839 and 841 may provide a database that will be used at block 827, even when subscription to cell and wi-fi is not possible. For example, cell and wi-fi points may be polled at specific intervals of time (e.g. every 15 sec.), and this polling will stop when processing arrives at block 837. In other words the time in block 841 can be a fixed interval (15 sec) at which device 10 will collect the cell and wi-fi information and pass it to block 833 for processing.

According to one exemplary embodiment, a memory of device 10 may be configured to store a plurality of locations of interest, each location of interest comprising a plurality of wireless access point identifiers associated therewith. A processing circuit 101 may be configured to determine whether the new wireless access point matches a wireless access point identifier of any of the plurality of locations of interest.

Various embodiments disclosed herein may include or be implemented in connection with computer-readable media configured to store machine-executable instructions therein, and/or one or more modules, circuits, units, or other elements that may comprise analog and/or digital circuit components configured, arranged or programmed to perform one or more of the operations recited herein. For example, a processing circuit may comprise one or more circuits, integrated circuits, processors, components, etc. which may be mounted on a single board or on a plurality of circuit boards, within a single housing or in multiple housings. By way of example, computer-readable media may include RAM, ROM, CD-ROM, or other optical disk storage, magnetic disk storage, or any other non-transitory medium capable of storing and providing access to desired machine-executable instructions. Blocks in the flowcharts may be performed in any order, and one or more blocks may be omitted from various embodiments.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is being claimed is:

1. A mobile computing device comprising:
   a location determination circuit; and
   a processing circuit, coupled to the location determination circuit, to:
   determine a current location of the mobile computing device and a destination location;
   determine an expected travel time from the current location to the destination location;
   disable continuous location tracking for a duration of time, the duration of time being determined based on the expected travel time;
   once the duration of time has elapsed, enable continuous location tracking; and
   generate a notification message in response to the processing circuit determining that the current location of the mobile computing device is within a predetermined distance of the destination location.

2. The mobile computing device of claim 1, wherein the processing circuit determines that the current location of the mobile computing device is within the predetermined distance of the destination location by comparing a first latitude and a first longitude of the current location with a second latitude and a second longitude of the destination location.

3. The mobile computing device of claim 1, wherein the duration of time is equal to the expected travel time.

4. The mobile computing device of claim 1, wherein the duration of time is set to a fraction of the expected travel time.

5. The mobile computing device of claim 1, wherein the processing circuit disables continuous location tracking for the duration of time in response to determining that the mobile computing device has begun moving toward the destination location.

6. The mobile computing device of claim 1, wherein the processing circuit disables continuous location tracking by turning off a global positioning system (GPS) tracking function.

7. A non-transitory computer-readable medium storing instructions that, when executed by one or more processors of a mobile computing device, cause the one or more processors to:
   determine a current location of the mobile computing device and a destination location;
   determine an expected travel time from the current location to the destination location;
   disable continuous location tracking for a duration of time, the duration of time being determined based on the expected travel time;
   once the duration of time has elapsed, enable continuous location tracking; and
   generate a notification message in response to determining that the current location of the mobile computing device is within a predetermined distance of the destination location.

8. The non-transitory computer-readable medium of claim 7, wherein the instructions cause the one or more processors to determine that the current location of the mobile computing device is within the predetermined distance of the destination location by comparing a first latitude and a first longitude of the current location with a second latitude and a second longitude of the destination location.

9. The non-transitory computer-readable medium of claim 7, wherein the duration of time is equal to the expected travel time.

10. The non-transitory computer-readable medium of claim 7, wherein the duration of time is set to a fraction of the expected travel time.

11. The non-transitory computer-readable medium of claim 7, wherein the instructions cause the one or more processors to disable continuous location tracking for the duration of time in response to determining that the mobile computing device has begun moving toward the destination location.

12. The non-transitory computer-readable medium of claim 7, wherein the instructions cause the one or more processors to disable continuous location tracking by turning off a global positioning system (GPS) tracking function.

13. A method of operating a mobile computing device, the method being performed by one or more processors and comprising:
- determining a current location of the mobile computing device and a destination location;
- determining an expected travel time from the current location to the destination location;
- disabling continuous location tracking for a duration of time, the duration of time being determined based on the expected travel time;
- once the duration of time has elapsed, enabling continuous location tracking; and
- generating a notification message in response to determining that the current location of the mobile computing device is within a predetermined distance of the destination location.

* * * * *